June 30, 1936. H. W. PARTLOW 2,045,959
TEMPERATURE CONTROL
Filed June 27, 1935 2 Sheets-Sheet 1
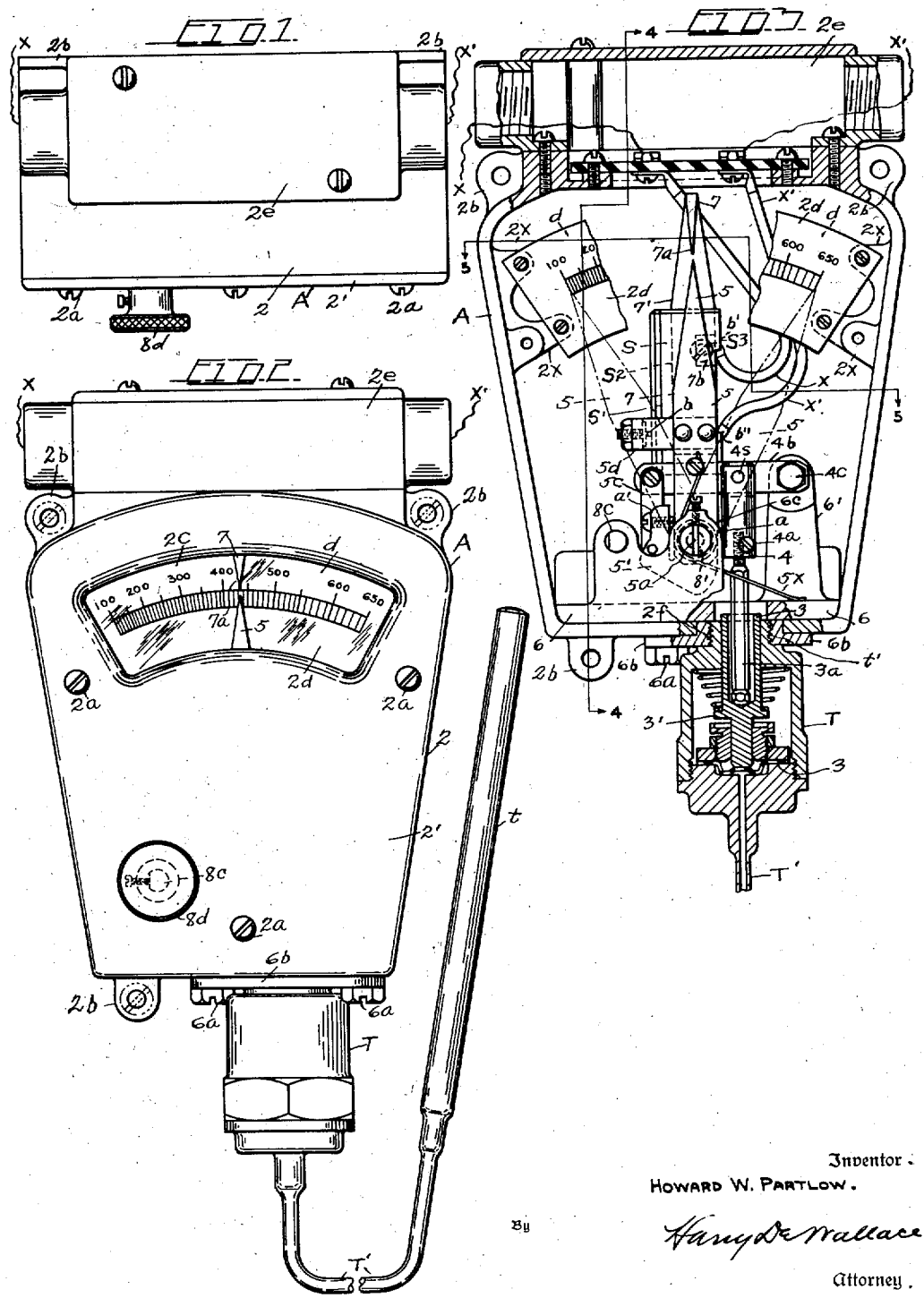
Inventor:
HOWARD W. PARTLOW.
By Harry De Wallace
Attorney.

June 30, 1936. H. W. PARTLOW 2,045,959
TEMPERATURE CONTROL
Filed June 27, 1935 2 Sheets-Sheet 2
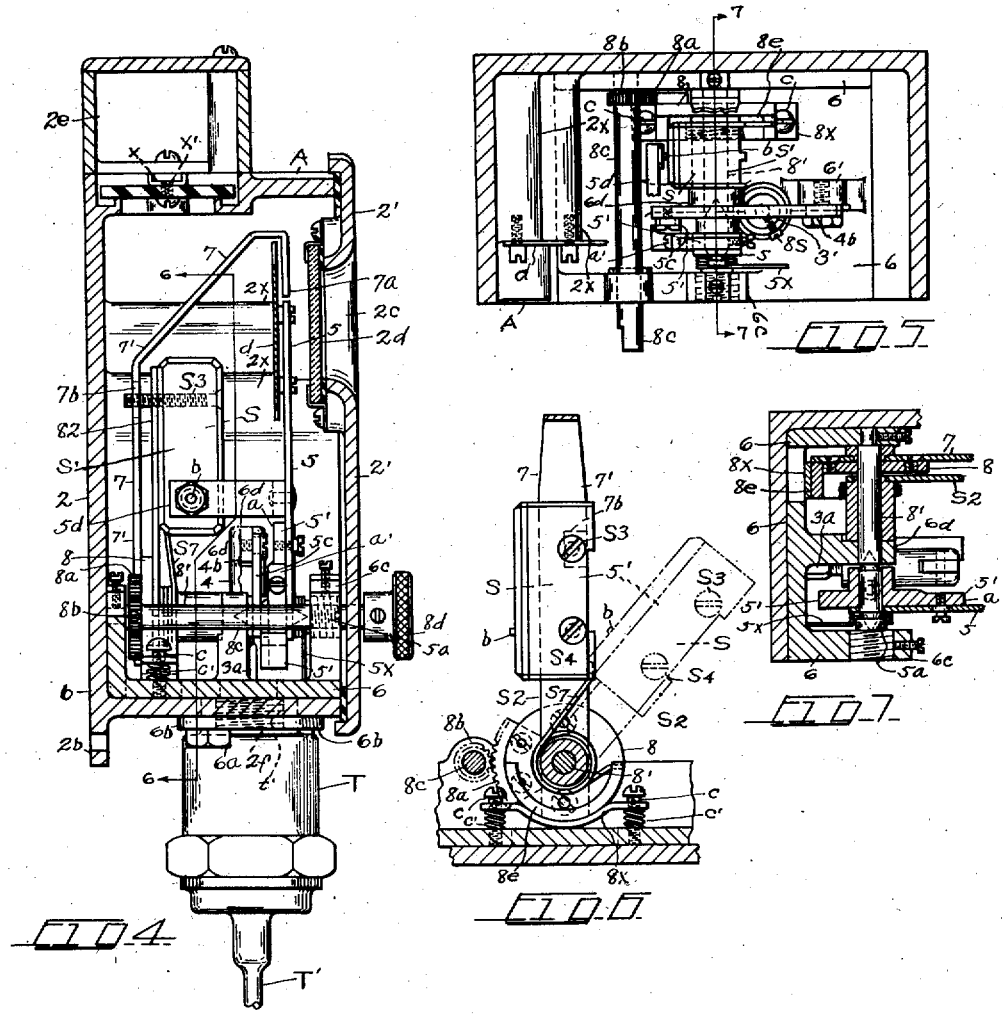
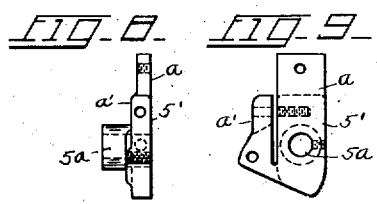
Inventor.
HOWARD W. PARTLOW.
By Harry D. Wallace.
Attorney.

Patented June 30, 1936

2,045,959

UNITED STATES PATENT OFFICE 2,045,959

TEMPERATURE CONTROL

Howard W. Partlow, Utica, N. Y., assignor to The Partlow Corporation, New Hartford, N. Y., a corporation of New York Application June 27, 1935, Serial No. 28,775

5 Claims. (Cl. 200—140)

This invention relates to improvements in temperature controls generally, and has for its primary object to provide a novel combination of thermal-electric temperature measuring and indicating means, which is arranged to accurately, automatically and safely control the flow of gas, air, water, oil, steam, or similar fluids, as well as to control the operations of any apparatus or systems employed for generating, dispensing or making use of heat, such for example, as gas burning ovens, electric heaters, dipping tanks, and the like; the thermal-electric controlling mechanism being arranged to indicate and maintain predetermined temperatures within a relatively broad range, and preferably embodies the two-wire principle of control that constitutes a normally closed circuit, which may be automatically opened when the temperature approximates the predetermined degree or gage, and thereafter intermittently stops or slows down the feed of the heating medium, in order to substantially maintain the said gage for long or short intervals or indefinitely, as may be desired. A further object is to include within the said circuit an extremely sensitive and quick-acting switch or circuit breaker, which is disposed in the path of and is adapted to be operated by pressure exerted by a thermally actuated pointer that indicates the true temperature of an oven, or other heater, and which traverses a graduated dial towards the right or left corresponding to the variations of the temperature; the said switch being initially carried along with a manually operable hand towards the graduation of the dial which indicates that the working temperature of the heater has been definitely predetermined by thermometrical test. A further object is to equip each controlling unit with its own powerful, sensitive and positive thermostat, whose expansive element preferably consists of mercury, or similar indestructible fluid or semi-fluid, which may initiate and afterwards control the various cycle of operations peculiar to ovens, furnaces and melting-pots, or other heat using instrumentalities, and whereby the whole plant or certain of the individual heating units thereof may be initiated, interrupted or stopped, without the aid of an operator except to primarily adjust or set the manually operable hand relatively to the graduations of the dial for indicating the maximum predetermined temperatures for different classes of work, the said automatic controls being arranged to effect, for example, the timely and sequential opening and closing of solenoid or motor operated gas valves, relays, etc., or the flashing of one or more electric signal lamps, provided only that, said solenoid or lamps be connected electrically in series with said switch. A further object is to provide means whereby said switch may be further moved in the direction or sense in which contact with the thermally operated parts was inaugurated without, however, altering the position of the manually operable hand or indicator. This further movement is made against a force or spring tension or otherwise tending to restore the switch to its normal or operating position. The object or purpose of the capability for said further movement being to protect the parts from undue stress or strain, should the temperature of the thermostat rise beyond the point of operation of the switch and the consequent interruption of the flow of the heating medium. A further object is to provide a hollow casing or body that contains or supports the whole of the mechanism that comprises the thermal-electric control, and which may be closed and sealed to exclude dust and prevent unauthorized handling or tampering. And a further object is to generally improve and simplify the construction and arrangement of automatic temperature controls, to render the controls more reliable and to reduce the number of parts, as well as to lessen the labor and cost of production and installation.

I accomplish these objects by the means set forth in the detailed description which follows, and as illustrated by the accompanying drawings, in which—

Figure 1 is a top plan view of the control. Fig. 2 is a front elevation of the same. Fig. 3 is a front view with the cover of the casing removed, showing the temperature indicator in coincidence ready to initiate a heating and controlling cycle. Fig. 4 is a vertical cross section taken on line 4—4 of Fig. 3, showing the indicator hand and the pointer relatively to the switch, also showing the arrangement of a common center upon which the pointers and switch rotate, also showing the gears that rotate the hand that determines the maximum temperatures. Fig. 5 is a horizontal section taken on line 5—5 of Fig. 3, showing in plan the switch box and its supporting arm, also showing in plan the thermally operating mechanism that oscillates the temperature measuring pointer. Fig. 6 is a vertical cross section taken on line 6—6 of Fig. 4, showing the switch box and its supporting arm in relation to the hand that indicates the predetermined temperature, also the gears that operate the hand and the means for braking said hand. Fig. 7 is a vertical cross section taken on line 7—7 of Fig. 5 showing the shaft or rod that constitutes the common center around which the several pointers and the switch arm rotate. Fig. 8 is an edge view of the U-shaped crank member that supports the thermally operated pointer and connects same with the link and lever means that is operated by the plunger of the thermostat. Fig. 9 is a plan view of Fig. 8.

In the drawings, A represents generally the automatic thermal-electric control, which is designed for regulating the temperatures of ovens, furnaces, melting-pots, and other plants requiring the use of heat, and comprises a hollow casing or body 2 that contains or supports all of the controlling mechanism or parts, and has a normally open front, which is closed and sealed by a cover 2' held in place by fasteners 2a. The body 2 may be mounted directly upon a convenient wall or part of a furnace or oven (not shown), and may be held in place by bolts that pass through perforated lugs 2b disposed in the plane of the back wall of the casing. The cover 2' is formed with a crescent-shaped opening 2c, which may be closed by a transparent part 2d, through which a graduated dial d may be observed; the said dial being supported by inwardly facing lugs 2x and secured by screws, as shown in Figs. 2 and 3.

The apparatus A is controlled mainly by a thermostat, which comprises a hollow cylindrical body T, that is fitted with a tube T', whose free end is formed with a bulb t, the tube and bulb preferably being filled with mercury, or other expansible fluid. The reduced inner end of the body T is preferably inserted into an opening 2f of the bottom of the casing 2, while the bulb t is usually inserted into the oven (not shown) where it is exposed to and heated by the maximum or working temperatures to be controlled by the apparatus A. Inside the body T is disposed a diaphragm 3 which is flexed by the mercury and operates a reciprocatable spring-tensioned plunger 3', which is bored axially for a part of its length to loosely receive a rod 3a that also extends through the opening 2f and having a threaded top end that screws into the threaded lower end of a forked member 4 and affords suitable axial adjustment of the rod 3a, which may be maintained by a set-screw 4a, as shown in Figs. 3 and 4. The top end of member 4 is pivotally connected, by a pin 4s, to the medial portion of a lever 4b, that may be raised and lowered by the expansion and contraction of the mercury acting through rod 3a and member 4, to cause a thermally actuated temperature indicating pointer 5 to be moved across the dial d, or to fluctuate corresponding to the variations of the oven temperature during the heating intervals. The lever 4b is pivoted at one end, by a pin 4c, to an upstanding lug 6' of a bracket or base 6, which is supported by the bottom of the casing 2, to which it is secured by screws or bolts 6a that also pass through a member 6b, which is formed with a threaded medial opening that registers with the opening 2f of the casing and bracket, and into which the threaded end t' of the body T may be screwed, as shown in Fig. 3. By this construction and arrangement, the body T together with the tube T' may be applied or removed without disturbing or detaching the bracket 6 and casing 2, and without loosening or shifting and destroying the adjustment of the temperature indicating means. The thermally controlled pointer 5 is mounted rigidly upon one arm a of a U-shaped crank-like part 5' (see Figs. 3, 5, 7 and 8), the latter being rotatable by means of a cone-and-socket pivot 5a, which extends through and is supported by spaced lugs 6c—6d, of the bracket 6; the opposite and shorter arm a' of part 5' being connected with the free end of lever 4b by means of a link 5c that rocks or oscillates the parts 5—5' by the vertical movements of said lever. This peculiar arrangement of the several parts that are associated or connected with the pointer 5 (see Figs. 3, 5 and 7) produces a powerful compound crank-like mechanism that operates, by the expansion and contraction of the mercury, smoothly and positively, and enables the tip of the pointer 5 to be moved the full extent of the relatively long calibrated stretch of the scale d, for indicating maximum degrees of predetermined temperatures required for different kinds of work.

The pointer 5 is equipped with an inverted L-shaped arm 5d that extends rearwardly at right angles to the plane of said pointer, and is employed for operating (opening) a switch S for breaking the normally closed electric circuit of the control, and allowing a valve or other fuel dispensing element (not shown) to close and automatically shut off the supply of the heating medium to the oven burners. The free end of arm d moves in an arc concentric to the dial d, whenever the pointer 5 fluctuates during the heating periods.

7 represents an indicating hand or marker which may be easily and freely moved at will across the graduated scale d, and may be set for accurately indicating on said scale the exact degree or gage of temperature required for any particular class of work. The hand 7 consists of a partially folded strip of flat metal 7', having at its free end a sharp point 7a, that may be so disposed as to coincide with any particular graduation of the scale d; the opposite end of said strip being mounted rigidly upon a disc 8 that is rotatable upon a shaft or rod 8' that aligns axially with the common center 5a (see Figs. 3, 4, 5, 6 and 7). The disc 8 is preferably fitted with a sector gear-portion 8a which meshes and is driven by a pinion 8b, the latter being mounted upon a shaft 8c that extends through the cover 2' and may be manually rotated by means of a knurled knob 8d that is disposed outside the cover. In order that the hand 7 may remain in any selected position relatively to the scale d, the disc 8 is formed with a segmental brake drum 8e which is frictionally engaged by a flexible band 8x, that tends to hold the hand 7 from accidentally shifting.

The switch S is preferably one type of the well-known "Burgess micro switches" disclosed in the patent to McGall, No. 1,960,020, May 22, 1934. This type of switch is normally closed, and may be opened to break the circuit, by means of a plunger or button b that protrudes from one face of the switch casing, which is arranged to be depressed, for opening the switch, by the arm 5d of pointer 5 when the tip of the latter is brought into coincidence with the tip or point 7d of the hand or marker 7, as shown in Figs. 3, 4 and 5.

The switch S is enclosed by a sealed box S', which is provided with external terminals b'—b'', to which wires x—x' are respectively attached, and from which the wires lead to a junction or outlet box 2e which is mounted on the top of the casing 2.

The electric circuit of the control comprises the two wires x—x', that may conduct the current from and towards its source, and includes the switch S, and may also embrace the winding of a solenoid motor, or other electrical means for controlling—opening and closing any suitable gas valve (not shown) that feeds the fuel or heating medium. The circuit x—x' is normally closed so that immediately the main switch (not shown) of any ordinary lighting system is closed, the solenoid and other electrically related parts become energized and ready to exercise the safe control of the temperature of an oven or furnace, as described.

The switch S is disposed above and parallel to the hand 7, and is mounted upon and is secured to a flat bar or arm S2, that rotates on the common center or axis 5a, by screws S3—S4; the lower end of the support S2 being perforated to receive and freely rotate upon the shaft 8', one of the screws, as S3, preferably extending past the bar 7' and engaging a notch 7b formed in one edge of said bar, which enables the hand 7 to carry or move the switch against the tension of a spring S7 (see Figs. 4 and 7), towards the right according to Figs. 3, 4, and 6 to the full extent of the travel of said hand, where the switch S remains during the heating period, or until the hand 7 requires a new adjustment for indicating a change in the predetermined temperature, and so on. By this arrangement, the switch S substantially follows the range of the hand 7 when the latter is moved towards a graduation representing the higher degree or value of temperature. But when the hand 7 is moved towards zero of the scale, the switch S is forced back by the tension of its spring S7.

The indicators 5—7 and switch S all rotate around the common axis 5a—8' when the parts are manually or automatically operated respectively by the operator or the thermostat T. When a heater, the electric circuit and the controlling mechanisms are put in order and ready to initiate a heating cycle, the operator grasps the knurled knob 8d, and turns it in the direction to adjust and set the hand 7 for indicating the predetermined temperature required for a heating period about to be initiated. The said hand is then left in the last named position until the said period is ended.

The pointer 5 is also provided with a spring 5x which normally exerts its tension for moving said pointer towards zero, where the said pointer always comes to rest when the temperature of the oven falls to zero, as at the end of a heating cycle. The pointer 5, however, is capable of moving the switch S beyond the predetermined degrees of temperature indicated by the settings of the hand 7, in case the temperature of the thermostat should rise beyond the point of operation of the switch and the consequent interruption of the flow of the heating medium. During this further movement of the switch S by the pointer 5, the arm 5d remains in contact with the plunger b, holds the switch S open, and prevents the feed of the gas to the burners of the oven, until the temperature of the thermostat and oven falls two or three degrees below the gage indicated by hand 7. At the end of the return movement of pointer 5 and switch S, the lever or arm 5d will have broken the contact of said arm with the plunger b, and this will effect the immediate closing of the switch and the resumption of the feed of the fuel for again raising the heat of the oven to the maximum indication represented by the setting of the hand 7, as explained. The brake band 8x is preferably secured at its ends to the back wall of the casing 2 by screws c, and springs c' (see Figs. 4 and 6), which are adjustable for increasing or decreasing the tension of the braking parts.

Having thus described my invention, what I claim is—

1. In a temperature control, a casing having a graduated dial, a manually operable hand, a pointer, a pivoted spring pressed switch, means carried by the hand to move the switch therewith upon setting of the hand, means actuated by the pointer to operate the switch, a substantially U-shaped member, means to connect said pointer to one arm of the U-shaped member, a lever pivoted at one end thereof, a link pivoted to the other end of the lever and to the other arm of the U-shaped member, a thermostat, and means pivoted to an intermediate part of the lever and having connection with the thermostat so as to be operated by the latter.

2. In a temperature control, a casing having a graduated dial, a manually operable pivoted hand, a pointer, an encased switch pivoted independently of the hand and being removable as a unit and having an operating member extending exteriorly of the switch case, means whereby to move the switch with the hand upon setting of the hand, means to constantly urge the switch in the direction of zero of the dial, a pointer, means operable by the pointer to actuate the operating member of the switch, and a thermostat for actuating the pointer.

3. In a temperature control, a casing having a graduated dial, a shaft, a hand mounted on the shaft, manual means to rotate the shaft thereby to set the hand, an arm freely mounted on the shaft, spring means to tension the arm to normally urge same in the direction of zero on the dial, an encased switch carried by the arm and being removable as a unit and having an operating member extending exteriorly of the switch case, means whereby upon setting of the hand to move the switch therewith, a pointer, means operable by the pointer to actuate the operating member of the switch, and a thermostat for actuating the pointer.

4. In a temperature control, a casing having a graduated dial, a shaft, a hand mounted on the shaft, manual means to rotate the shaft, thereby to set the hand, an arm freely mounted on the shaft, spring means to tension the arm to normally urge same in the direction of zero on the dial, a casing having a switch therein, the latter provided with an operating member extending exteriorly of the casing, means to removably affix the switch casing to the arm, means whereby upon setting of the hand to move the switch therewith, a pointer, a member connected to the pointer and engageable with said operating member of the switch to actuate the latter, and a thermostat for actuating the pointer.

5. In a temperature control, a casing having a graduated dial, a shaft, a hand mounted on the shaft, manual means to rotate the shaft, thereby to set the hand, an arm freely mounted on the shaft, spring means to tension the arm to normally urge same in the direction of zero on the dial, a casing having a switch therein, the latter provided with an operating member extending exteriorly of the casing, means to removably affix the switch casing to the arm, including a screw which has a projecting end t be engaged by and upon setting of the hand to move the switch therewith, a pointer, means carried by the pointer and engageable with said operating member of the switch to actuate the latter, and a thermostat for actuating the pointer.

HOWARD W. PARTLOW.